Dec. 21, 1965  KIYOSHI OIZUMI ETAL  3,224,858
APPARATUS FOR BLOWING GLASS BULBS
Filed Aug. 29, 1961  6 Sheets-Sheet 2

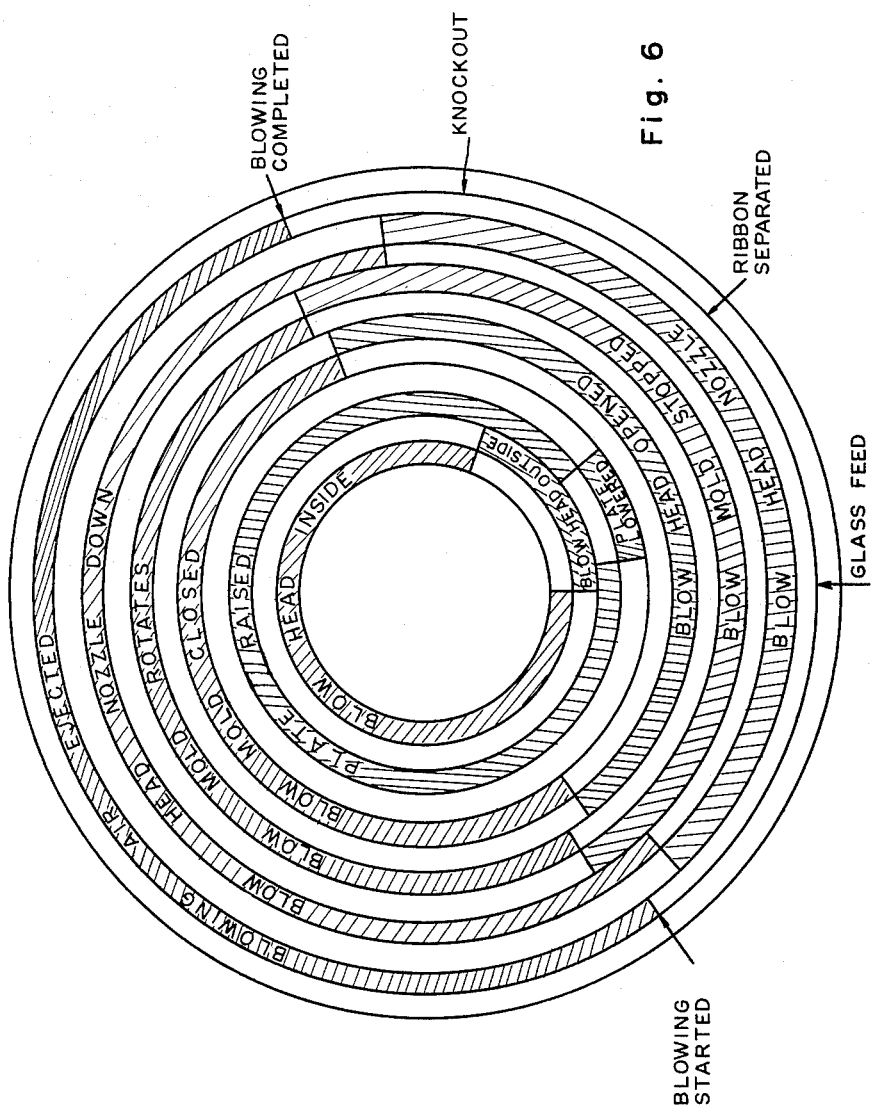

United States Patent Office 3,224,858
Patented Dec. 21, 1965

3,224,858
APPARATUS FOR BLOWING GLASS BULBS
Kiyoshi Oizumi, Tokyo, Mitsugu Fukuda, Kawasaki-shi, and Goichi Otani, Tokyo, Japan, assignors to Tokyo Shibaura Electric Co., Ltd., Kawasaki-shi, Japan, a corporation of Japan
Filed Aug. 29, 1961, Ser. No. 134,664
3 Claims. (Cl. 65—185)

The present invention relates to improvements in or relating to apparatus for blowing glass bulbs.

Such apparatus which has previously been in use may be divided into three general types: (a) the first type, i.e., the type of so-called "ribbon machines" in which a ribbon of glass is continuously fed to be converted into glass bulbs, (b) the second type, in which cup-shaped glass blanks from a glass melting furnace intermittently fall down into blow molds, and (c) the third type, i.e., the type of so-called "Ivanhoe" machines in which glass blanks are picked up by suction from a glass melting furnace. The usual rate of production is about 50,000 bulbs per hour with the first type, about 2,400 bulbs per hour with the second type and about 3,600 bulbs per hour with the third type. It will be clearly observed that the first type of apparatus is far better than the two others in this respect.

In addition, the range of bulb sizes obtainable with the type a apparatus has its lower limit far below that of the other types. For example, bulbs for fluorescent light starter lamps or for MT (miniature) vacuum tubes can be blown only with an apparatus of type a.

Thus, the use of blowing apparatus of type a, that is, so-called "ribbon machines" is most desirable for blowing miniature bulbs in quanitities, but previous machines of this type, for example, corning ribbon machines have been subject to various deficiencies as described below.

(a) First, since the major component parts of the apparatus including the ribbon support plates, blow heads and blow molds are secured to respective separate links or chain belts, the error in pitch of working parts cannot be eliminated completely even when the respective elements have initially been mounted at the same pitch with a means provided for placing the three components in correct aligned relation at a predetermined point. This tends to cause some offset or eccentricity in bulb wall section precluding formation of satisfactory products.

(b) Second, previous ribbon machines have necessarily been very substantial in length (from approximately ten to thirteen meters) and this tends to cause torsional vibration in connection with the machine drive.

(c) Because of the use of chain drive, the movements of the machine parts cannot be smooth and the machine components such as blow molds, blow heads and ribbon plates cannot be easily replaceable.

It is not always easy nor simple to feed a glass stream from the glass melting furnace as a ribbon through the apparatus rectilinearly so as to have its center axis in alignment with the axis of the molds which are arranged in a straight line. In such cases, the blowing operation is very unsatisfactory as will readily be understood.

The present invention is intended to overcome these deficiencies of previous ribbbon machines.

The present invention will now be described in detail with reference to the accompanying drawings which illustrate one preferred embodiment of the invention.

In the drawings:

FIG. 6 is a timing diagram of the cyclic operation of the apparatus.

Figure 1:
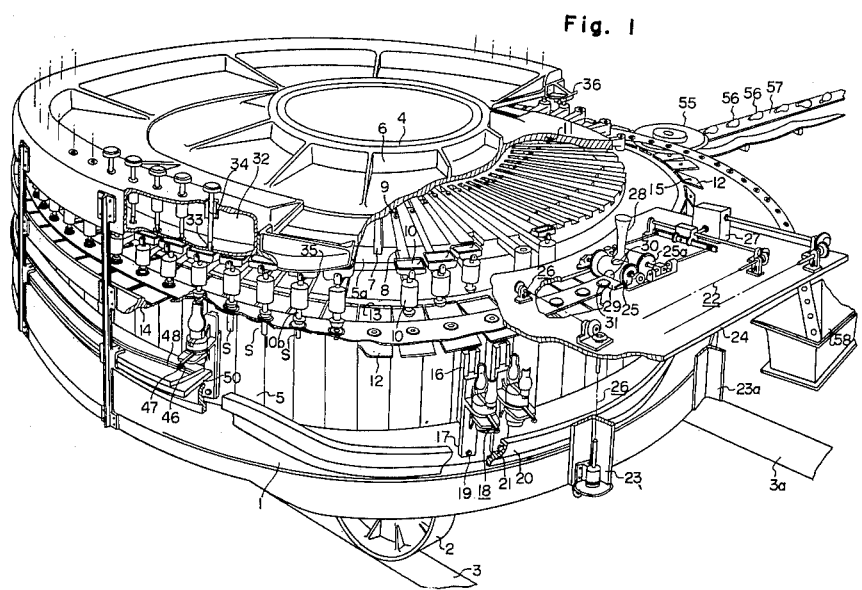
FIG. 1 is a fragmentary perspective view, partly broken away, of the blowing apparatus embodying the present invention.
Figure 2:
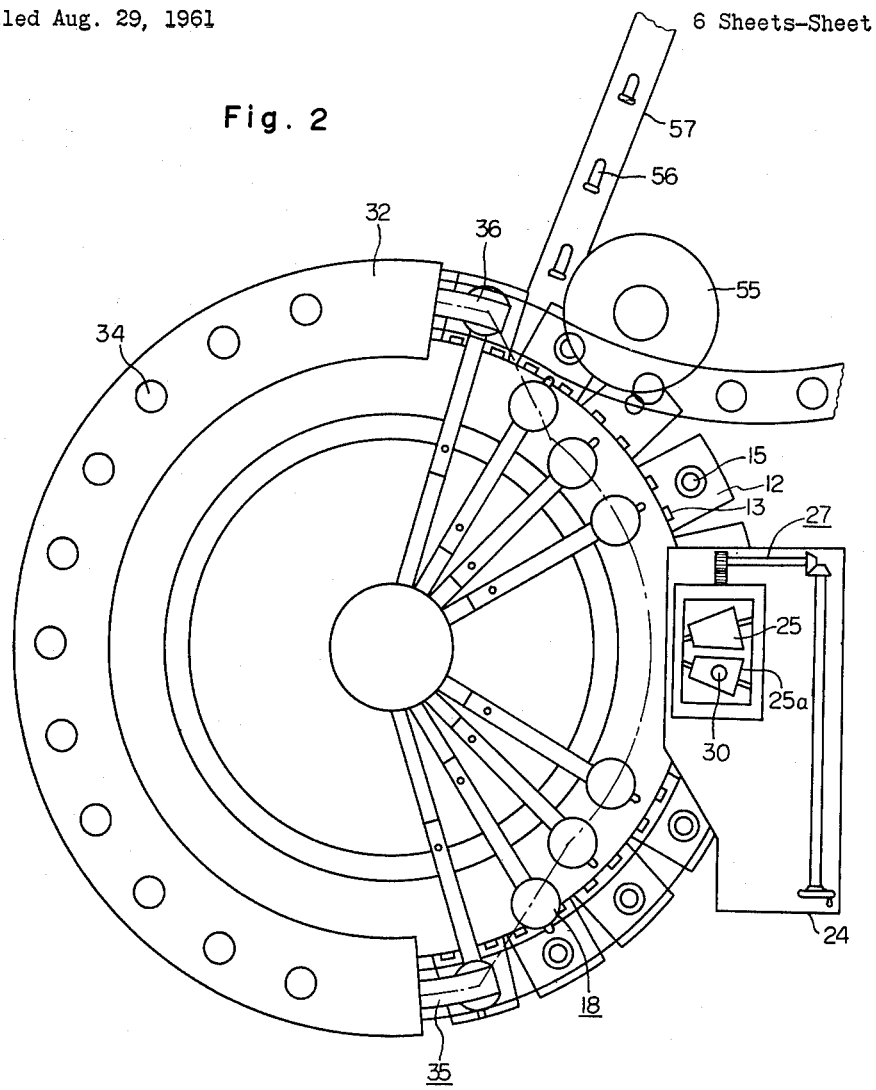
FIG. 2 is a plan view of the apparatus shown in FIG. 1.
Figure 3:
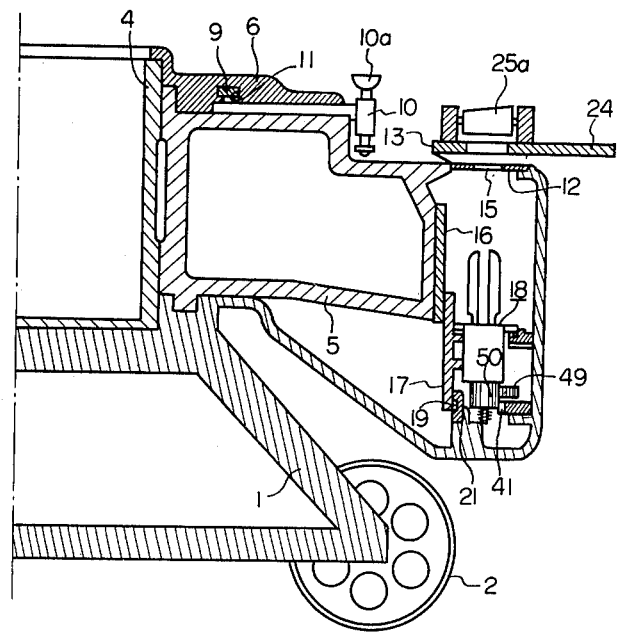
FIG. 3 is a fragmentary axial cross section of the apparatus taken through one of the blow molds.

Referring to the drawings, and particularly to FIGS. 1 to 3, inclusive, which illustrate one preferred embodiment of the present invention, the apparatus includes a rigidly constructed base 1 with wheels 2 carried on the underside thereof and resting upon foundations 3 and 3a.

Extending upwardly from the base 1 is a center column 4 formed integral therewith and over which is fitted a spider 5 for rotational movement about the column. A mechanism for driving the spider 5 is accommodated in the interior thereof through not shown for clarity's sake.

Held in sliding engagement with the top surface of the spider 5 is a slotted disc 5a which is covered by a non-rotating top plate 6 secured to the center column 4.

The slotted disc 5a has an array of radially extending slots 7, in which are fitted respective slider bars 8 each carrying at the inner end a follower roller or disc 9 and at the outer end a blow head 10.

As shown, the follower rollers or discs 9 are fitted in a camming slot 11 formed in the underside of the top plate 6 so that the slider bars 8 and hence the blow heads 10 are moved radially under control of the camming slot 11 as both of the disc 5a and the spider 5 rotate.

Provided at the top of the spider 5 along the periphery thereof are a multiplicity of ribbbon support plates 12 arranged at regular intervals corresponding to the angular positions of said slider bars 8. These plates are each pivoted to the peripheral edge of the top of the spider 5 by a hinge 13. The outer end of each of the ribbon support plates 12 rests upon an annular guide 14 rigid with the machine base 1 and is caused to effect a certain tilting movement with rotation of the spider under control of the annular guide 14.

The ribbon support plates each have a blow aperture 15 formed therein for engagement with one of said blow heads.

Secured to the outside periphery of the spider 5 are guide plates 16 which correspond to the respective ribbon support plates 12 and have each a guideway to receive the associated slide plate 17, to which a blow mold 18 is mounted.

The slide plates 17 each carry a follower roll 19 at the the bottom, which roll is in engagement with a groove 21 formed inside of an annular roller guide 20 secured to the base 1. It will be understood that, as the spinder 5 rotates, the slide plates 17 and hence the blow molds 18 are moved vertically under control of the guide groove 21.

A glass feed mechanism is provided as indicated generally at 22 which comprises a platform 24 secured to the base 1 by way of posts 23 and 23a, a pair of rollers 25–25a mounted on the platform 24, a drive mechanism for the rollers as indicated generally at 26, and a roller clearance control mechanism as generally indicated at 27. The glass feed mechanism 22 have these component parts arranged so that a stream of molten glass 28 flowing down from a glass melting furnace (not shown) is squeezed into a flat ribbon 29. One of the rollers 25 has a number of recesses 30 formed around the periphery thereof so as to form enlargements 31 on the glass ribbon 29 which are spaced apart from each other at the same pitch as the ribbon support plates.

Figure 4:
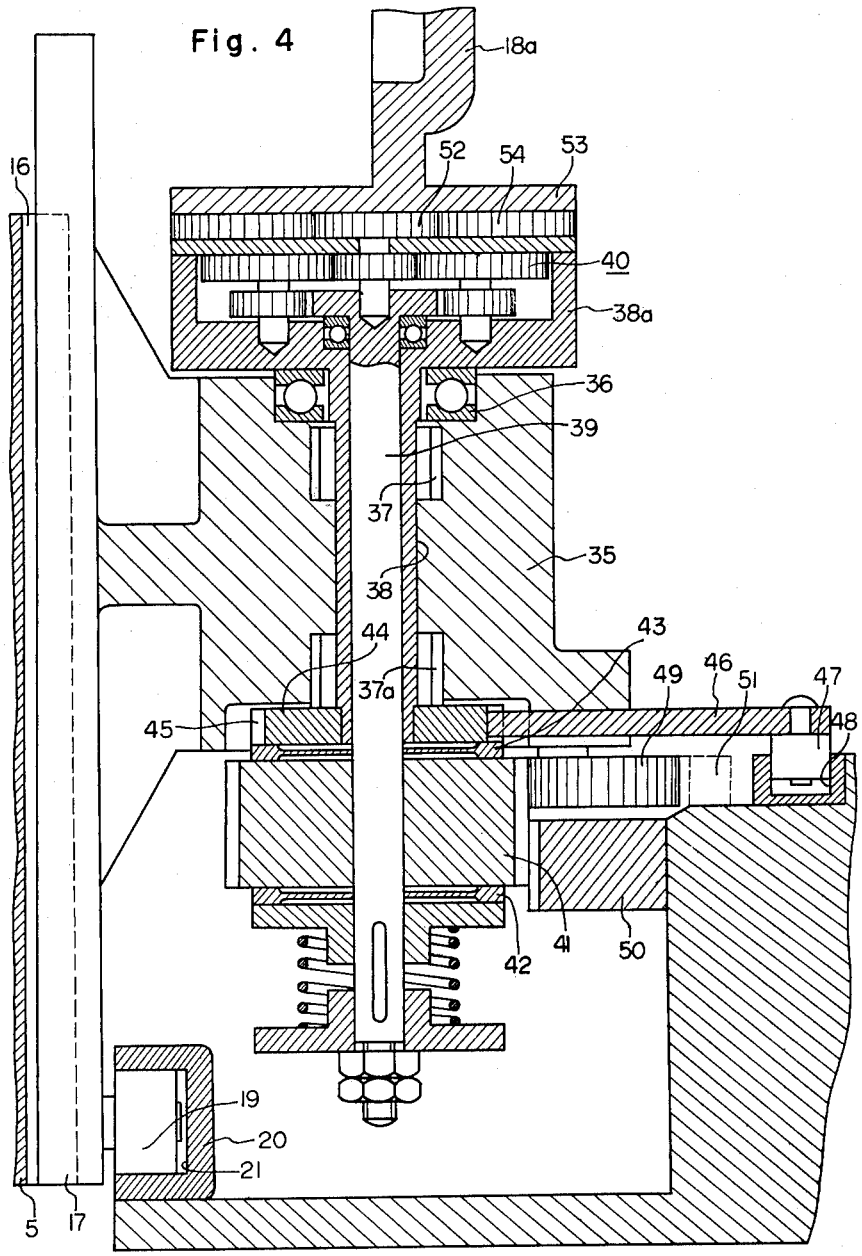
FIG. 4 is an enlarged fragmentary cross section showing the blow mold controlling mechanism of the apparatus shown in FIGS. 1 to 3.
Figure 5:
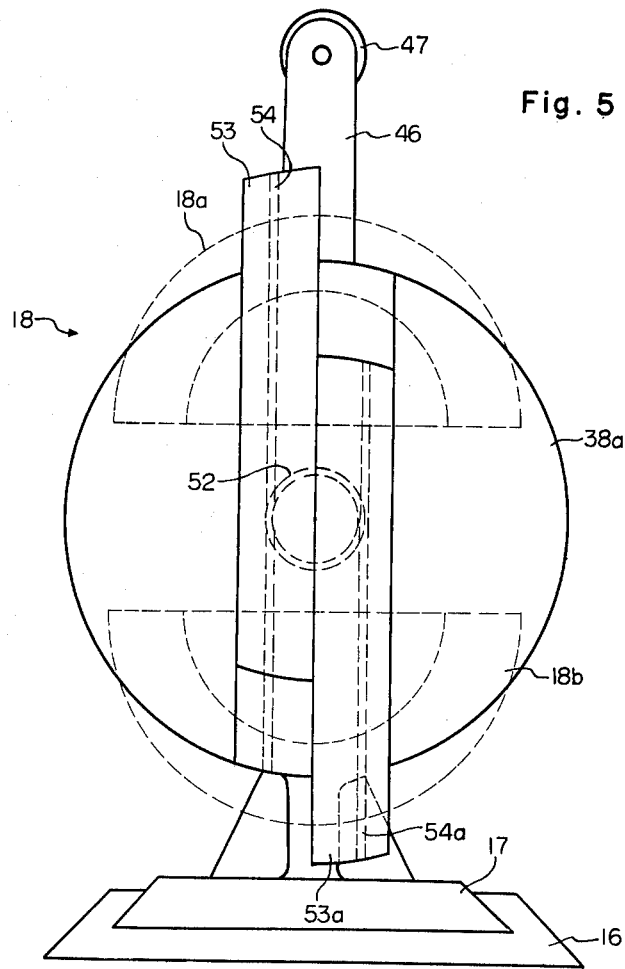
FIG. 5 is a diagrammatic top plan view of the bolw mold.

Formed on a part of the top of the top plate 6 is an air tank 32 which extends slightly beyond the outer peripheral edge of the plate and is continuously connected with an exterior source of air supply. The underside of the air tank 32 forms a sliding surface over which cups 10a on top of the respective blow heads slidingly proceed, and is formed with air orifices 33, with which respective needles 34 cooperate for flow control. In addition, the air tank 32 carries at the front and tail ends curved guide surfaces 35 and 36, respectively, for advancing and retracting the blow heads. The blow molds 18 will now be described in detail with reference to FIGS. 4 and 5.

The slide plates 17 fitted to the respective stationary plates 16 each carry a cylindrical support bracket 35 which in turn carries the associated blow mold. Fitted in the support bracket is a tubular shaft or sleeve 38 through the intermediary of a thrust bearing 36 and radial bearings 37–37a. The sleeve 38 carries at the top an enlargement which forms a gear chamber and blow mold holder 38a. A rod 39 is fitted in the sleeve 38 and carries at the top a gear mechanism generally indicated at 40 and at the bottom a gear 41 loosely fitted on the rod.

Provided between the bottom end of the rod 39 and the bottom of the sleeve 38 are friction couplings 42 and 43 through which the rod and the sleeve are respectively connected with the gear 41.

The tubular shaft or sleeve 38 carries also at the bottom a stop disc 44 formed with notches 45 on the outer periphery thereof. A stop link 46 is provided the inner end of which is engageable with said notches 45 to control the rotation of the sleeve 38.

The stop link 46 carries at the outer end a follower roll 47, which is in engagement with a cam slot 48 formed opposite to the air tank so that the stop link 46 is engaged and released at predetermined times under control of the cam slot 48.

A gear 49 is arranged in mesh with the gear 41, which cooperates with an internal gear 50 formed opposite to substantially the entire extent of the air tank. Another internal gear 51 is formed above said first internal gear 51 adjacent the tail end of the air tank where said first internal gear 51 no longer extends.

A gear 52 is disposed to be driven by the gear mechanism 40 at the top of the tubular shaft 38 and is in mesh with racks 54–54a formed inside of the lower portions of respective mold carrier plates 53–53a, which are slidably fitted in a face plate 38b on top of the gear chamber 38a. Accordingly, the rotation of the rod 39 is effective to move the mold sections 18a–18b toward and away from each other.

Also provided on the base 1 adjacent the tail end of the air tank are a knock-out bar for knocking out blown bulbs and a rotary cutter 55 for separating the waste ribbon from the ribbon support plates. The blown bulbs after being knocked out fall down upon a conveyor belt 57 to be carried away for the next work stage while the separated waste ribbon is thrown into a chute 58 to be broken down.

The manner in which bulb envelopes are blown upon the apparatus of the present invention as described above will now be described particularly with reference to FIG. 6.

A stream of molten glass is squeezed by rollers 25–25a into a flat ribbon 29 which carries enlargements 31 formed at the same pitch as the ribbon support plates 12. The glass ribbon 29 is fed forwardly as the spider 5 rotates with the successive enlargements 31 placed in accurate aligned engagement with the blow apertures 15 in the plates by proper adjustment of the apparatus.

Meanwhile, the blow heads 10 are moved radially outwardly in succession by means of the cam slot 11 while being rotated with rotation of the spider. It will be understood that, immediately before each of the blow heads 10 engages the air tank 32, the blow head is placed immediately above one of the enlargements 31 of the ribbon or the blow aperture 15 in the associated ribbon support plate 12, as indicated at X in FIG. 6.

With further rotation of the spider 5, the cup 10a on top of the blow head 10 is brought into engagement with the curved inlet surface 35 of the air tank 32 so that the nozzle 10b of the blow head is moved downwardly until the bottom of the nozzle 10b is pressed against the adjacent enlargement 31 preparatory for actual blowing operation.

At this time, the glass ribbon is formed under the pressure of the blow head 10 with a certain size of sag S which is embraced by the associated blow mold 18 when the latter after being raised by the annular guide 20 is closed substantially in the raised position by the cooperation of the internal gear 50 and the gear 41 in engagement therewith immediately before the blow head 10 is brought to the row of orifices 33 formed in the bottom of the air tank.

The blow head 10 continues to move to place the cup 10a thereof opposite to the adjacent orifice 33 so that the air is ejected through the nozzle 10b to start blowing operation. Shortly after the starting of the blowing operation, the stop link 46 is released by means of the cam slot 48 and the sleeve 38 starts to rotate to close the blow mold 18, the sleeve continuing rotation during the blowing period with the mold 18 held closed.

It will be understood that the blowing of the glass blank into a bulb envelope is completed when it has been moved past the air tank 32. Before the blow head 10 and the blow mold 18 move out from under the air tank, the stop link 46 is brought back into engagement with the notch 45 formed in the stop disc 44 under the control of the cam slot 48 to stop rotation of the blow mold, and the gear is then brought in mesh with the internal gear 51, the gear 44 being positioned clear of the internal gear 50. As a result, the rod 39 is now rotated in the opposite direction to move the mold sections 18a–18b away from each other.

As the blow head 10 and the blow mold 18 leave the air tank, the latter is lowered by the annular guide 20 while the nozzle 10b of the blow head 10 is raised under the bias of a spring (not shown) during the time when the blow head cup 10a moves past the curved surface 36 at the tail end of the air tank 32.

On the other hand, the blown bulb envelope 56 after the blow mold has been lowered comes into collision with the knockout lever to be knocked out to fall onto the conveyor 57 and is carried away for the next work stage. At a position just behind the knock-out the waste ribbon is separated from the ribbon support plates 12 by the rotary cutter 55.

The ribbon support plates 12 are again raised by the annular guide 14 after the separation of the waste ribbon and before reaching the glass feed mechanism generally indicated at 22. In FIG. 1, the guide 14 is shown broken away in this region for clarity's sake.

FIG. 6 diagrammatically illustrates the time sequence of these movements.

As will be appreciated from the foregoing, the apparatus according to the present invention includes a substantially unitary structure comprising major components arranged integrally for blowing bulb envelopes while effecting continuous rotational movement and thus is not only suitable for mass production of glass bulbs but is adapted to furnish extremely accurate and satisfactory products including miniature bulbs.

What is claimed is:

1. An apparatus for blowing glass bulbs comprising a base, a plate supported from the base and spaced thereabove; an air pressure tank supported along a portion of the peripheral edge of the plate and extending thereabove to define an arcuate pathway therebeneath; said air tank including a plurality of orifices aligned along said arcuate pathway; a spider supported from the base beneath the plate and adapted for continuous rotary movement; slotted means interposed between the plate and the top of the spider comprising a plurality of radial slot-tracks at regular intervals; a plurality of sliders respectively disposed in the slot-tracks for radial movement relative to the spider; a plurality of blow heads disposed on the outer ends of said sliders for radial movement thereby outwardly to said pathway; camming means comprising a common track in the plate and followers on the respective sliders to cause raidal displacement of the sliders and blow heads as the spider is rotated; ribbon support plates hingeably connected to the outer periphery of the spider at regular intervals corresponding to the sliders and the blow head intervals; each of said support plates having an aperture therein for registering with the blow heads respectively; means for squeezing molten glass into a flat ribbon on said support plates; said last mentioned means providing enlargements of the glass ribbon about each aperture of the support plates; fixed guide means adjacent to the supporting plates for lifting and guiding the glass ribbon carried by the plates into contact with the blow heads as the latter are moved to said pathway into contact with and beneath the air tank; a plurality of blow molds carried by the spider respectively at the spacing intervals of the blow heads and spaced therebeneath; further guiding means for raising the blow molds successively to the ribbon support plates into blowing position as the molds and plates move under the air tank; means with the blow head for opening said orifices to establish air communication with the blow heads as they successively pass under each orifice to blow the glass enlargements into bulbs in the respective blow molds; and means for rotating each blow mold about its own axis to open and close the molds to form and release the glass bulbs substantially under the air tank.

2. The apparatus as claimed in claim 1 wherein the means for squeezing molten glass into a flat ribbon on said support plates comprises rollers with one of said rollers having recesses around its periphery to form enlargements on the glass ribbon; and wherein the means for rotating each blow mold about its own axis comprises a support shaft for each blow mold; camming means disposed beneath the air tank and fixed to the frame; and means interconnecting the shaft and camming means for establishing rotation of the blow molds as they successively move beneath the air tank.

3. The apparatus as claimed in claim 1 wherein the air tank is adapted to continuously provide air pressure; and wherein the means for opening the air tank orifices include needles closing the orifices and adapted to be raised vertically when contacted by the blow heads to permit air to flow through the orifices and into the blow heads.

References Cited by the Examiner
UNITED STATES PATENTS

| | | | |
|---|---|---|---|
| Re. 19,439 | 1/1935 | Smith | 65—184 |
| 2,235,359 | 3/1941 | Curry et al. | 65—184 X |
| 2,393,265 | 1/1946 | Richardson et al. | 65—184 X |
| 2,643,486 | 6/1953 | English | 65—255 |

DONALL H. SYLVESTER, *Primary Examiner.*